(12) United States Patent
Morrison et al.

(10) Patent No.: US 9,205,499 B2
(45) Date of Patent: Dec. 8, 2015

(54) CUTTING INSERT WITH FINISHING AND ROUGHING CUTTING EDGES

(71) Applicant: Kennametal Inc., Latrobe, PA (US)

(72) Inventors: Lewis Ray Morrison, Latrobe, PA (US); Ravishankar Iyer, North Huntingdon, PA (US)

(73) Assignee: KENNAMETAL INC., Latrobe, PA (US)

(*) Notice: Subject to any disclaimer, the term of this patent is extended or adjusted under 35 U.S.C. 154(b) by 246 days.

(21) Appl. No.: 14/023,579

(22) Filed: Sep. 11, 2013

(65) Prior Publication Data

US 2015/0071717 A1    Mar. 12, 2015

(51) Int. Cl.
*B23C 5/20*    (2006.01)
*B23C 5/06*    (2006.01)
*B23C 5/22*    (2006.01)

(52) U.S. Cl.
CPC . *B23C 5/207* (2013.01); *B23C 5/06* (2013.01); *B23C 5/202* (2013.01); *B23B 2200/087* (2013.01); *B23B 2222/14* (2013.01); *B23C 5/20* (2013.01); *B23C 5/205* (2013.01); *B23C 5/2217* (2013.01); *B23C 2200/0461* (2013.01); *B23C 2200/208* (2013.01); *B23C 2200/326* (2013.01); *B23C 2200/367* (2013.01); *B23C 2210/486* (2013.01)

(58) Field of Classification Search
CPC ........ B23C 5/20; B23C 5/205; B23C 5/2217; B23C 2210/486; B23C 2200/0483; B23C 2200/087; B23C 2200/128; B23C 2200/326
USPC ...................................... 407/48, 116, 42, 113
See application file for complete search history.

(56) References Cited

U.S. PATENT DOCUMENTS 3,875,663 A  *  4/1975  Gustafson et al. ............. 407/114
4,124,326 A  *  11/1978  Cost ............................... 407/114
(Continued)

FOREIGN PATENT DOCUMENTS

EP      0287711 A2  *  10/1988  ............ B23C 5/202
EP      2614908 A1      7/2013
(Continued)

OTHER PUBLICATIONS

N/A, , "Milling Cutters", http://www.prezisstools.com/face-milling-cutters-and-circular-milling-cutters.html.
(Continued)

*Primary Examiner* — Sunil K Singh
*Assistant Examiner* — Ryan Rufo
(74) *Attorney, Agent, or Firm* — Larry R. Meenan (57) ABSTRACT

An indexable cutting insert includes a top surface, a bottom surface and a plurality of side surfaces. Each side surface includes a first pair of chip grooves, and a second pair of chip grooves. A planar corner surface is disposed between each side surface. A corner radius extends between the top and bottom surfaces and the planar corner surface. A plurality of primary wiper cutting edges are formed at an intersection between each of the first pair of chip grooves and the top and bottom surfaces. A plurality of secondary roughing cutting edges are formed at an intersection between each corner radius and each of the first pair of chip forming grooves. A plurality of wiper cutting edges are formed at an intersection between each planar corner surface and each of the second pair of chip forming grooves. A milling cutter is also disclosed.

18 Claims, 6 Drawing Sheets

(56) References Cited

U.S. PATENT DOCUMENTS

| | | | |
|---|---|---|---|
| 4,214,846 A * | 7/1980 | Kraemer | 407/114 |
| 4,341,493 A | 7/1982 | Erkfritz | |
| 4,470,731 A | 9/1984 | Erkfritz | |
| 4,556,345 A | 12/1985 | Philippi | |
| 4,575,287 A | 3/1986 | Oshnock et al. | |
| 4,597,695 A | 7/1986 | Johnson | |
| 4,631,994 A | 12/1986 | Jester et al. | |
| 4,848,977 A | 7/1989 | Kieninger | |
| 5,816,751 A | 10/1998 | Frecska | |
| 6,109,838 A * | 8/2000 | Riviere | 407/36 |
| 6,167,958 B1 * | 1/2001 | Lynde | 166/55.6 |
| 6,523,768 B2 | 2/2003 | Recker et al. | |
| 6,733,212 B2 | 5/2004 | Nagaya et al. | |
| D523,040 S | 6/2006 | Niebauer et al. | |
| 7,086,812 B2 | 8/2006 | Gamble et al. | |
| 7,131,794 B2 | 11/2006 | Robinson et al. | |
| 7,367,753 B2 | 5/2008 | Maurer | |
| 7,390,150 B2 | 6/2008 | Kocherovsky et al. | |
| 7,513,717 B2 | 4/2009 | Engstrom et al. | |
| 7,534,075 B2 * | 5/2009 | Kress et al. | 407/66 |
| 7,909,544 B2 * | 3/2011 | Jansson | 407/42 |
| 7,976,250 B2 | 7/2011 | Fang et al. | |
| 7,997,833 B2 | 8/2011 | Hayashizaki et al. | |
| 8,282,320 B2 | 10/2012 | Hartlohner et al. | |
| 8,337,123 B2 | 12/2012 | Ishida | |
| 8,434,974 B2 | 5/2013 | Spitzenberger | |
| 8,454,278 B2 | 6/2013 | Hartlohner et al. | |
| D710,409 S | 8/2014 | Morrison et al. | |
| D713,433 S | 9/2014 | Morrison et al. | |
| 2007/0041797 A1 * | 2/2007 | Jang et al. | 407/40 |
| 2009/0136304 A1 * | 5/2009 | Satran et al. | 407/104 |
| 2009/0285646 A1 | 11/2009 | Oprasic et al. | |
| 2010/0129167 A1 | 5/2010 | Morrison | |
| 2010/0150671 A1 | 6/2010 | Oprasic et al. | |
| 2012/0051852 A1 | 3/2012 | Choi et al. | |
| 2012/0051855 A1 | 3/2012 | Löf | |
| 2012/0282054 A1 * | 11/2012 | Jager et al. | 408/200 |
| 2013/0129434 A1 * | 5/2013 | Bhagath | 407/51 |
| 2013/0195566 A1 * | 8/2013 | Bhagath | 407/33 |
| 2013/0195567 A1 | 8/2013 | Sunnvius et al. | |

FOREIGN PATENT DOCUMENTS

| | | | | |
|---|---|---|---|---|
| FR | 2894858 A1 | 6/2007 | | |
| GB | 1164322 | 9/1969 | | |
| JP | 2004209615 A | 7/2004 | | |
| WO | WO 9717157 A1 * | 5/1997 | | B23C 5/202 |
| WO | WO 2012102480 A2 * | 8/2012 | | B23C 5/202 |

OTHER PUBLICATIONS

N/A, , "Tungmill", http://www.imc-companies.com/Tungaloy/tcat/familyhdr.asp?fnum=44&app=802&mapp=IT&GFSTYP=M&lang=EN&type=1.

* cited by examiner

CUTTING INSERT WITH FINISHING AND ROUGHING CUTTING EDGES

BACKGROUND OF THE INVENTION

1. Field of the Invention

The invention pertains to the field of indexable cutting inserts. More particularly, the invention pertains to an indexable cutting insert having a plurality of primary finishing cutting edges and a plurality of secondary roughing cutting edges.

2. Description of Related Art

Typical metalworking operations are conducted with a machine tool or similar equipment using a cutting insert. First, machining is undertaken with one or more inserts suitable for rough cutting, which removes large amounts of material from a workpiece but leaves a relatively rough surface finish. Then, the roughly turned surface is machined by another insert configured to give the workpiece a finished cut. Such operations are time consuming and expensive since multiple cutting inserts must be used to machine a single workpiece to a desired shape and operations must be periodically halted in order to replace the inserts for different cutting operations.

SUMMARY OF THE INVENTION

The problem of providing a fine surface finish, particularly on a workpiece made of metal, is solved by designing a cutting insert with both primary wiper cutting edges and secondary roughing cutting edges that are presented to the workpiece when the cutting insert is isometrically mounted in a pocket of a cutter body. In addition, by designing a cutting insert with both primary wiper cutting edges and secondary roughing cutting edges that are presented to the workpiece when the cutting insert is tangentially mounted in the pocket of the cutter body.

In one aspect of the invention, an indexable cutting insert comprises a top surface, a bottom surface identical to the top surface, and a plurality of side surfaces that are identical to each other. Each side surface includes a first pair of chip grooves extending perpendicular to a central, longitudinal axis, and a second pair of chip grooves extending parallel to the central, longitudinal axis. A planar corner surface connects each side surface. A corner radius extends between the top and bottom surfaces and the planar corner surface. A plurality of primary wiper cutting edges are formed at an intersection between each of the first pair of chip grooves and the top and bottom surfaces. A plurality of secondary roughing cutting edges are formed at an intersection between each corner radius and each of the first pair of chip forming grooves. A plurality of wiper cutting edges are formed at an intersection between each planar corner surface and each of the second pair of chip forming grooves.

In another aspect of the invention, a combination milling cutter and cutting insert includes cutting insert comprises a top surface, a bottom surface identical to the top surface, and a plurality of side surfaces that are identical to each other. Each side surface includes a first pair of chip grooves extending perpendicular to a central, longitudinal axis, and a second pair of chip grooves extending parallel to the central, longitudinal axis. A planar corner surface connects each side surface. A corner radius extends between the top and bottom surfaces and the planar corner surface. A plurality of primary wiper cutting edges are formed at an intersection between each of the first pair of chip grooves and the top and bottom surfaces. A plurality of secondary roughing cutting edges are formed at an intersection between each corner radius and each of the first pair of chip forming grooves. A plurality of wiper cutting edges are formed at an intersection between each planar corner surface and each of the second pair of chip forming grooves. The milling cutter comprises a tool body including a plurality of circumferentially-spaced pockets for receiving the cutting insert, wherein at least one of the plurality of primary wiper cutting edges and at least one of the plurality of secondary roughing cutting edges are presented to a workpiece when the cutting insert is isometrically mounted in the milling cutter, and wherein at least one of the plurality of wiper cutting edges is presented to a workpiece when the cutting insert is tangentially mounted in the milling cutter.

In another aspect of the invention, a cutting tool comprises a tool body including plurality of circumferentially-spaced pockets, and a cutting insert mounted in the plurality of pockets, the cutting insert comprising a top surface, a bottom surface identical to the top surface, and a plurality of side surfaces that are identical to each other. Each side surface includes a first pair of chip grooves extending perpendicular to a central, longitudinal axis, and a second pair of chip grooves extending parallel to the central, longitudinal axis. A planar corner surface connects each side surface. A corner radius extends between the top and bottom surfaces and the planar corner surface. A plurality of primary wiper cutting edges are formed at an intersection between each of the first pair of chip grooves and the top and bottom surfaces. A plurality of secondary roughing cutting edges are formed at an intersection between each corner radius and each of the first pair of chip forming grooves. A plurality of wiper cutting edges are formed at an intersection between each planar corner surface and each of the second pair of chip forming grooves, wherein the cutting insert is both isometrically mounted and tangentially mounted in the plurality of circumferentially-spaced pockets.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
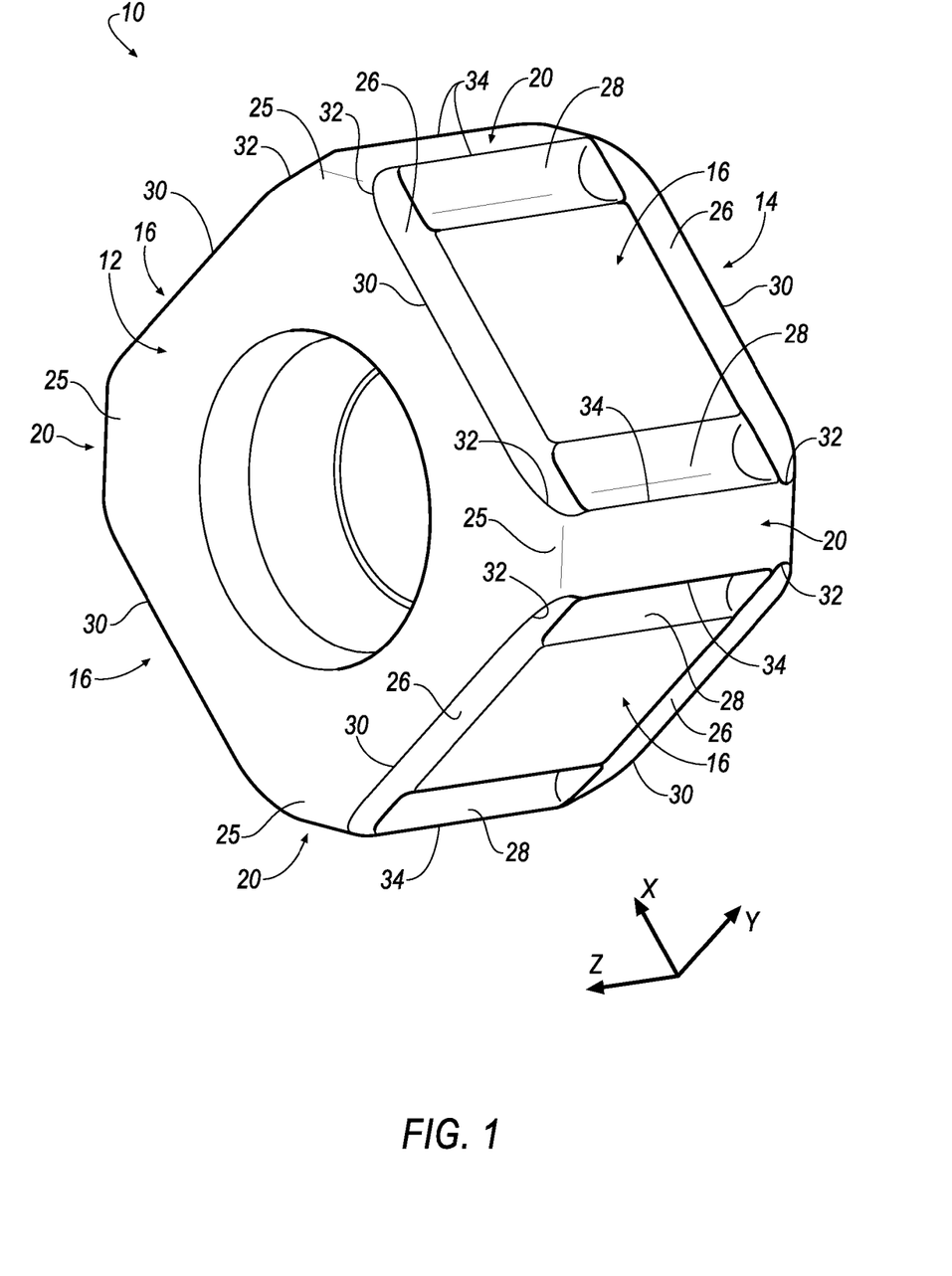
FIG. 1 is an isometric view of a cutting insert in accordance with an embodiment of the invention.
Figure 2:
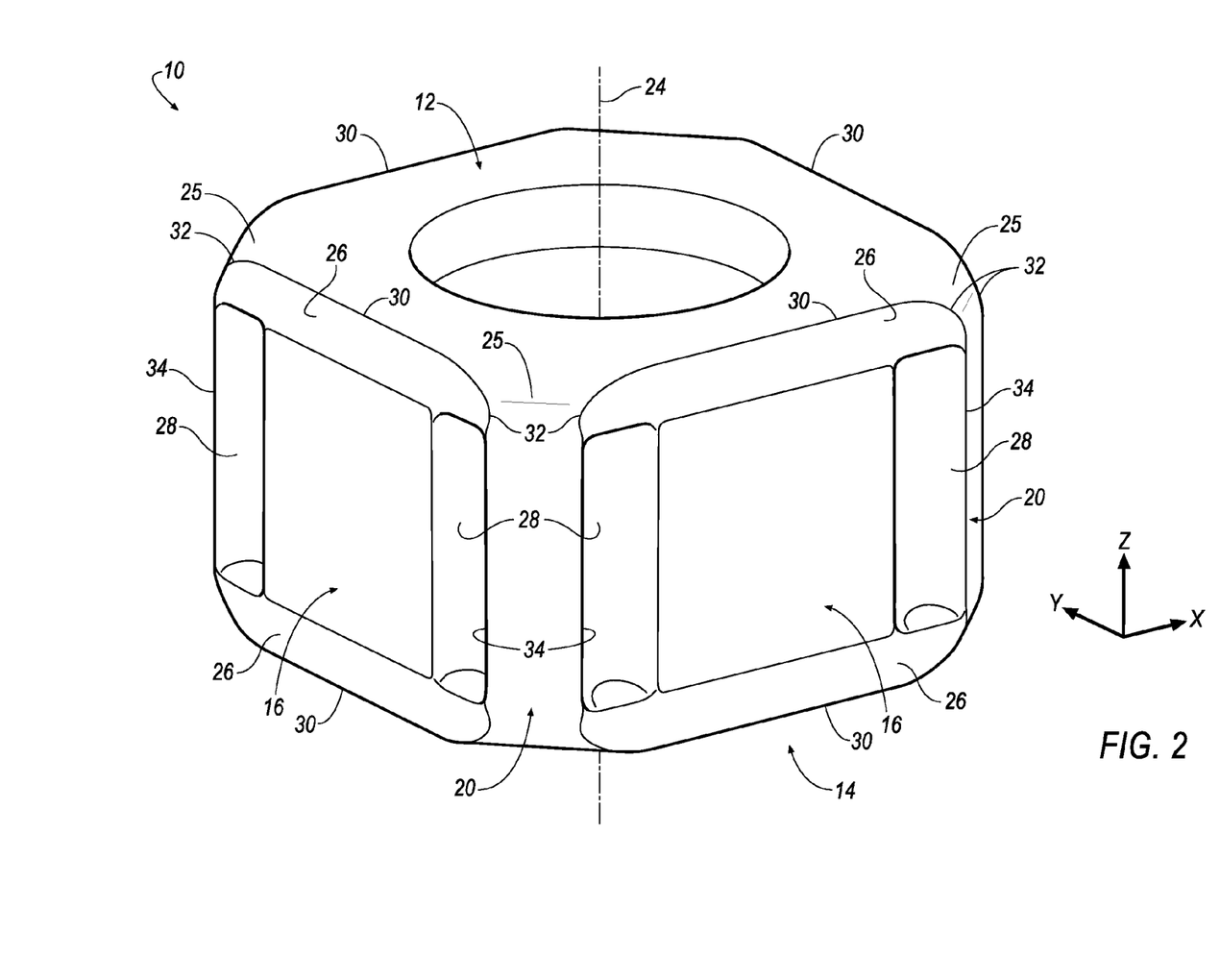
FIG. 2 is an another isometric view of the cutting insert of FIG. 1.
Figure 3:
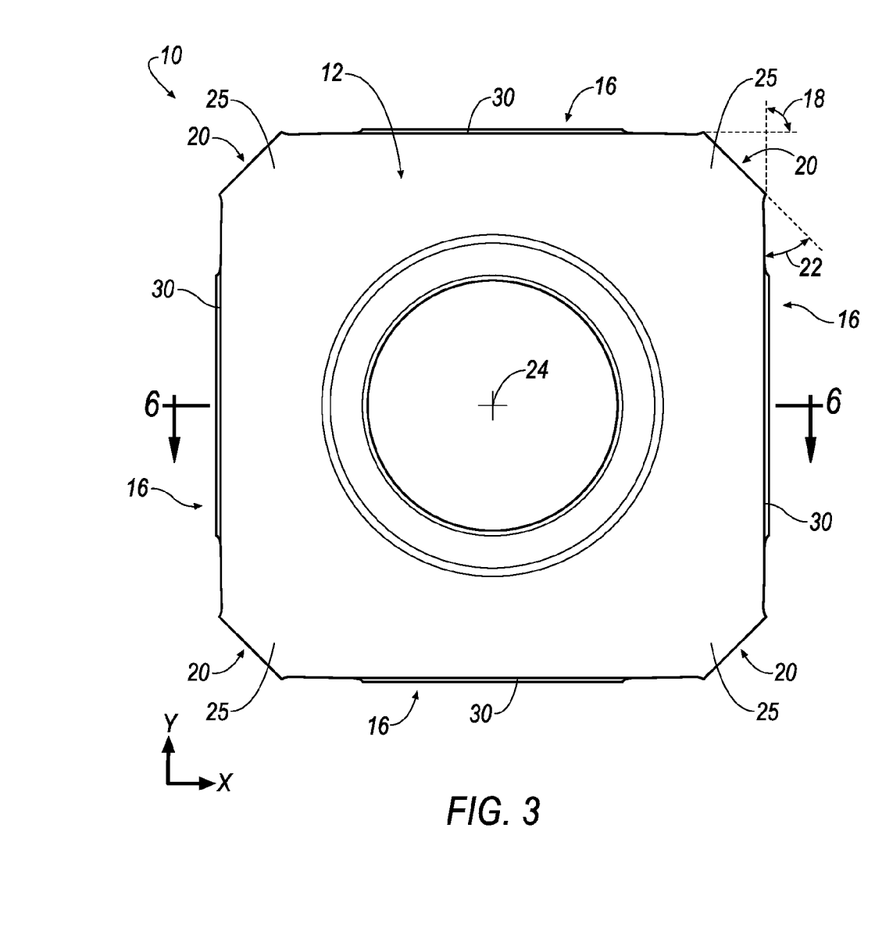
FIG. 3 is a top view of the cutting insert of FIG. 1.

Referring now to FIGS. 1-6, an indexable cutting insert 10 is shown according to an embodiment of the invention. In general, the cutting insert 10 has a polygonal body made of a wear-resistant material of a type known in the art. The cutting insert 10 is of a generally cubic in shape that includes a top surface 12, a bottom surface 14 that is parallel and identical to the top surface 12, and a plurality of side surfaces 16 that are identical to each other. As shown in FIG. 3, the cutting insert 10 has four (4) side surfaces 16, each side surface 16 has an angle 18 of approximately ninety (90) degrees with respect to an adjacent side surface 16.

In the illustrated embodiment, each side surface 16 is substantially perpendicular to both the top and bottom surfaces 12, 14. In other words, the top and bottom surfaces 12, 14 are substantially parallel to each other and perpendicular to the side surfaces 16. That is, the side surfaces 16 have a clearance angle of zero (0) degrees. Thus, both the top and bottom surfaces 12, 14 of the cutting insert 10 can be presented to the workpiece (not shown). Thus, the "top" surface 12 becomes the "bottom" surface when the bottom surface 14 is presented to the workpiece, and vice versa. The side surfaces 16 engage the pocket (not shown) when the cutting insert 10 is mounted in the tool body during cutting operations. Preferably, one of the top and bottom surfaces 12, 14 and at least two side surfaces 16 should engage the tool body when the cutting insert 10 is properly indexed in the tool body. The cutting insert 10 can be isometrically mounted and tangentially mounted in the tool body, as described below.

The cutting insert 10 includes a planar corner surface 20 between each of the side surfaces 16. In the illustrated embodiment, the cutting insert 10 includes four (4) planar corner surfaces 20 formed at an angle 22 of forty-five (45) degrees with respect to the adjacent side surface 16, as shown in FIG. 3. The top and bottom surfaces 12, 14 are perpendicular to a central, longitudinal axis 24 of the cutting insert 10, while the side surfaces 16 and the corner surfaces 20 are parallel to the axis 24, as shown in FIG. 2. Thus, the cutting insert 10 is symmetrical about all three axes (x-, y- and z-). Because the cutting insert 10 is symmetric about all three axes (x-, y-, z-) in which the top surface 12 is identical to the bottom surface 14, all the side surfaces 16 and the corner surfaces 20 are identical to each other, only the top surface 12, one side surface 16 and one corner surface 20 will be described in detail herein for brevity. However, it will be appreciated that any discussion of the top surface 12 applies to the bottom surface 14, the discussion of the side surface 16 applies to all the side surfaces 16, and the discussion of the corner surface 20 applies to all the corner surfaces 20.

Figure 4:
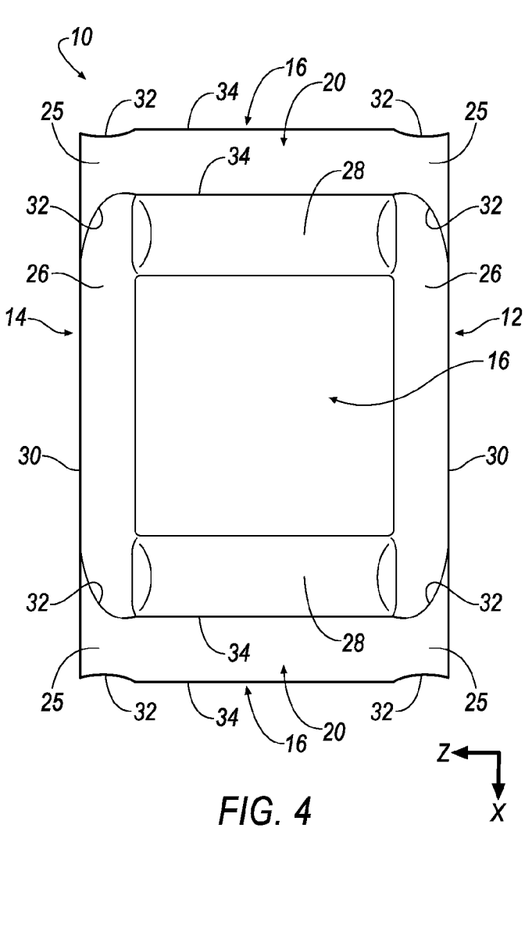
FIG. 4 is a side view of the cutting insert of FIG. 3.
Figure 5:
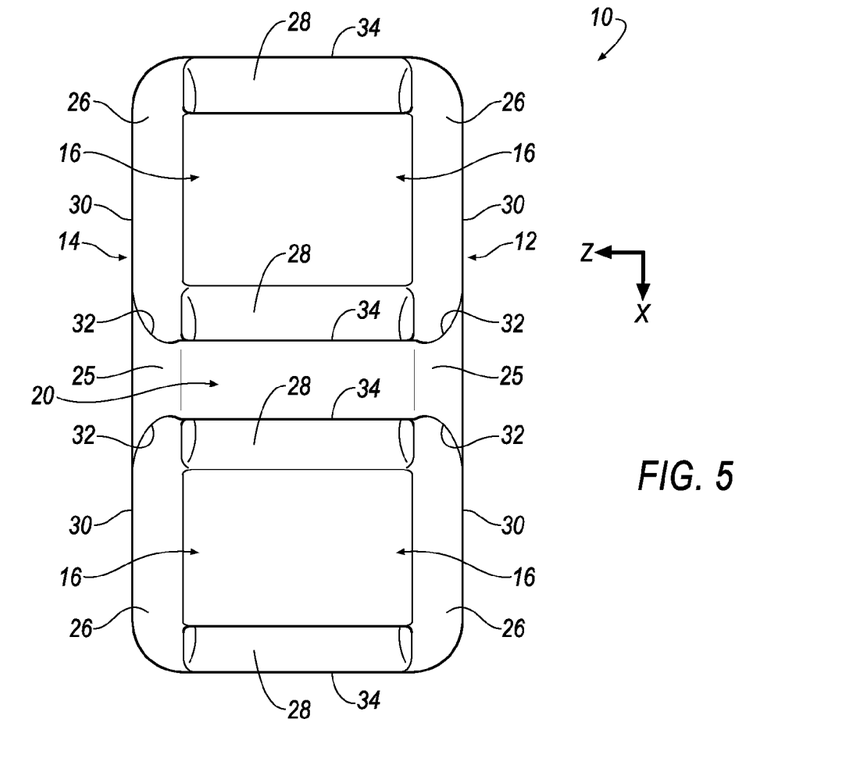
FIG. 5 is another side view of the cutting insert of FIG. 1.

A corner radius 25 extends entirely between the top and bottom surfaces 12, 14 of the cutting insert 10 and the planar corner surfaces 20. As seen in FIG. 4, each planar corner surface 20 extends entirely between two corner radius 25 associated with the top and bottom surfaces 12, 14.

Each side surface 16 includes one or more chip forming grooves formed therein. For example, each side surface 16 includes a pair of chip forming grooves 26 extending along the top and bottom surfaces 12, 14 and perpendicular to the central, longitudinal axis 24. In addition, each side surface 16 includes a pair of chip forming grooves 28 extending along the corner surfaces 20 and parallel to the central, longitudinal axis 24. The chip forming grooves 26, 28 have different profiles as shown in the illustrated embodiment. However, the chip forming grooves 26, 28 can have the same profile.

Figure 6:
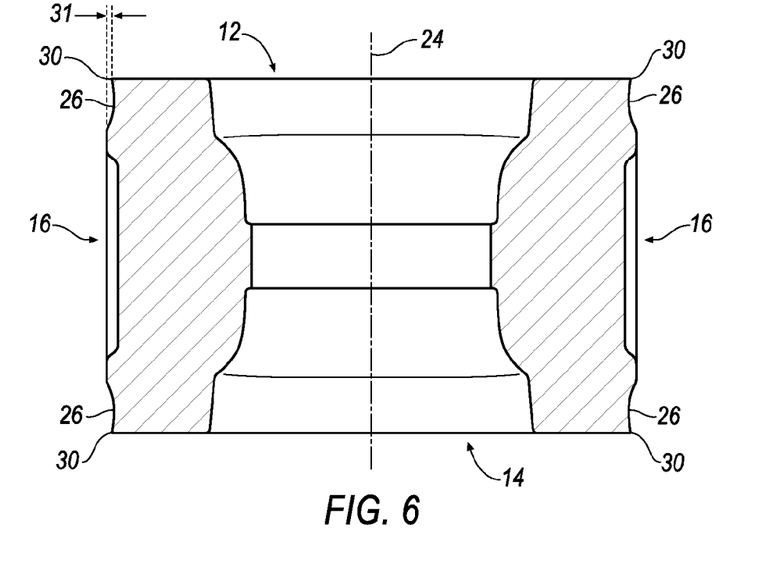
FIG. 6 is a cross-sectional view of the cutting insert taken along line 6-6 of FIG. 3.

A primary finishing wiper cutting edge 30 is formed at the intersection between each chip forming groove 26 and the top and bottom surfaces 12, 14 of the cutting insert 10. Thus, the cutting insert 10 has four (4) wiper cutting edges 30 formed at the intersection between the chip forming grooves 26 and the top surface 12, and four (4) wiper cutting edges 30 formed at the intersection between the chip forming grooves 26 and the bottom surface 14 for a total of eight (8) wiper cutting edges 30. As seen in FIG. 2, the wiper cutting edges 30 are perpendicular to the central, longitudinal axis 24 of the cutting insert 10. The wiper cutting edges 30 are the active, primary cutting edges when the cutting insert 10 is isometrically mounted in the cutting tool and it should be understood that the chip forming grooves 26 aid in the formation and removal of chips formed during a machining operation. As shown in FIG. 6, each finishing wiper cutting edge 30 is not coplanar with the side surface 16, but is located at a small distance 31 closer to the central, longitudinal axis 24. In other words, each finishing wiper cutting edge 30 is lower in elevation than the side surface 16 to allow the side surface 16 to contact the insert pocket 104 to properly seat the cutting insert 10 therein.

A secondary roughing corner cutting edge 32 is formed at the intersection between each corner radius 25 and each chip forming groove 26. Thus, the cutting insert 10 has eight (8) left-handed roughing corner cutting edges 32 and eight (8) right-handed roughing corner cutting edges 32 for a total of sixteen (16) roughing corner cutting edges 32. Each roughing corner cutting edge 32 is elliptical in shape because of the rounded shape of the corner radius 25 and the profile of the chip forming grooves 26.

A finishing wiper cutting edge 34 is formed at the intersection between each planar corner surface 20 and each chip forming groove 28. Thus, each side surface 16 of the cutting insert 10 has two (2) wiper cutting edges 34 formed at the intersection between the chip forming grooves 28 and the planar corner surfaces 20 for a total of eight (8) wiper cutting edges 34 (4 side surfaces×2 cutting edges/side=8 cutting edges). As seen in FIG. 2, the wiper cutting edges 30 are parallel to the central, longitudinal axis 24 of the cutting insert 10. The wiper cutting edges 34 are the active, primary cutting edges when the cutting insert 10 is tangentially mounted in the cutting tool and it should be understood that the chip forming grooves 28 aid in the formation and removal of chips formed during a machining operation.

It will be understood that the profile of the primary finishing wiper cutting edge 30 and the finishing wiper cutting edge 34 is defined by the cross-sectional shape of the chip forming grooves 26, 28, respectively. In the illustrated embodiment, the primary finishing wiper cutting edge 30 and the finishing wiper cutting edge 34 have a substantially planar profile. However, it will be appreciated that the invention is not limited by the profile of the primary finishing wiper cutting edge 30 and the finishing wiper cutting edge 34, and that the invention can be practiced with any desirable profile, such as a cutting edge having a large radius, and the like.

Figure 7:
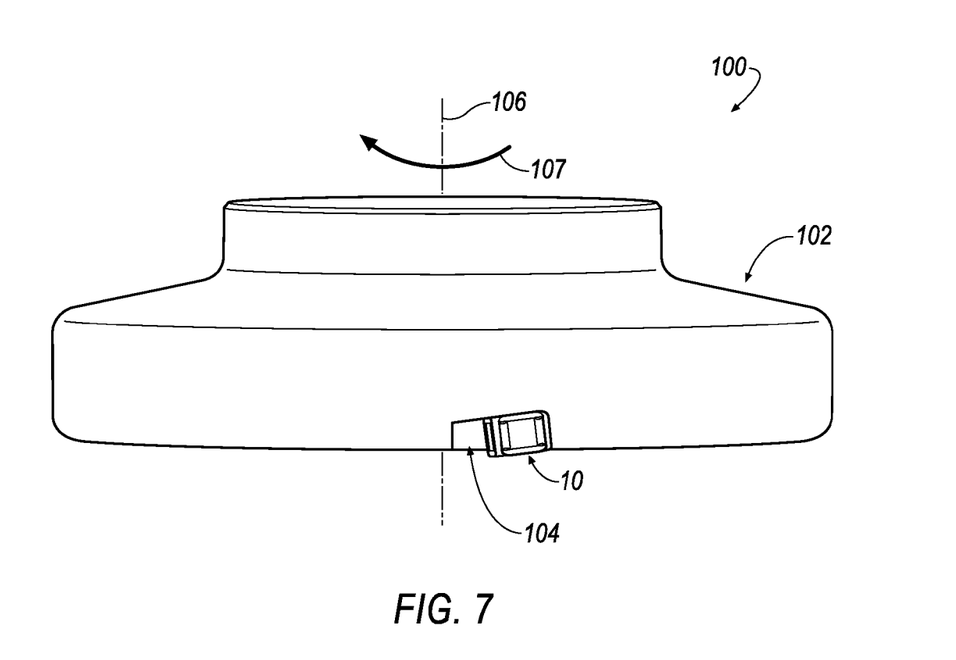
FIG. 7 is a side view of a milling cutter with the cutting insert of FIG. 1 isometrically mounted in a pocket according to an embodiment of the invention.
Figure 8:
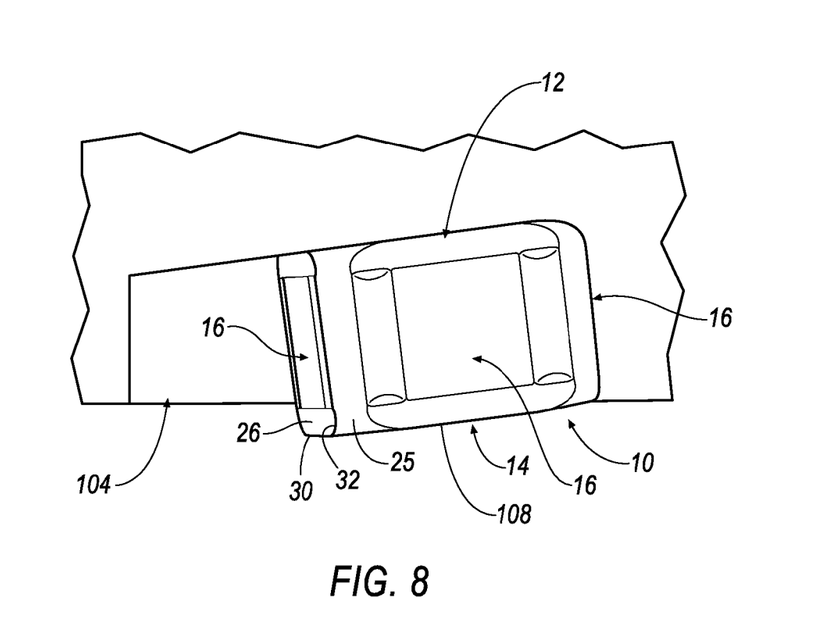
FIG. 8 is an enlarged view of the cutting insert isometrically mounted in the pocket of the milling cutter of FIG. 7.

Referring now to FIGS. 7 and 8, a cutting tool 100, such as a milling cutter, is shown according to an embodiment of the invention. The milling cutter 100 comprises a tool body 102 with a plurality of circumferentially-spaced pockets 104 (only one pocket 104 is shown for brevity). Each pocket 16 is adapted to receive the cutting insert 10, which is securely held in the pocket 104 by means of a mounting mechanism 108, such as a screw and the like. The tool body 102 is designed to be rotatably driven about a central longitudinal axis 106 in a direction 107. Only a single pocket 104 in which the cutting insert 10 is isometrically mounted is shown in the illustrated embodiment for brevity. However, it will be appreciated that the invention is not limited by the number of pockets 104 in which the cutting insert 10 can be isometrically mounted therein, and that the invention can be practiced with any desirable number of pockets 104 that are capable of isometrically mounting the cutting insert 10. As seen in FIGS. 7 and 8, both the finishing wiper cutting edges 30 and the roughing corner cutting edges 32 are presented to the workpiece (not shown) when the cutting insert 10 is isometrically mounted in the pocket 104 of the milling cutter 100.

Figure 9:
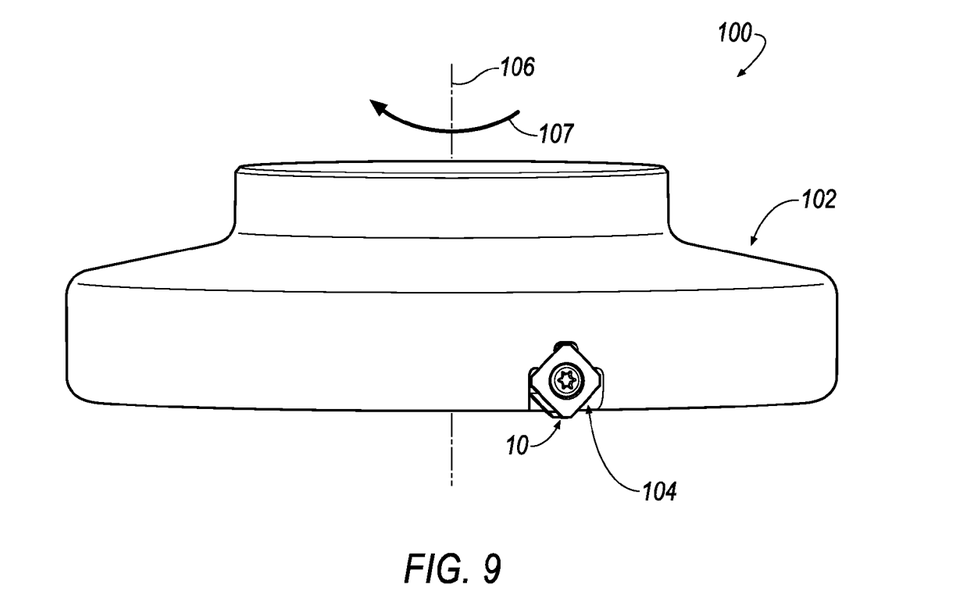
FIG. 9 is a side view of a milling cutter with the cutting insert of FIG. 1 tangentially mounted in a pocket according to an embodiment of the invention.
Figure 10:
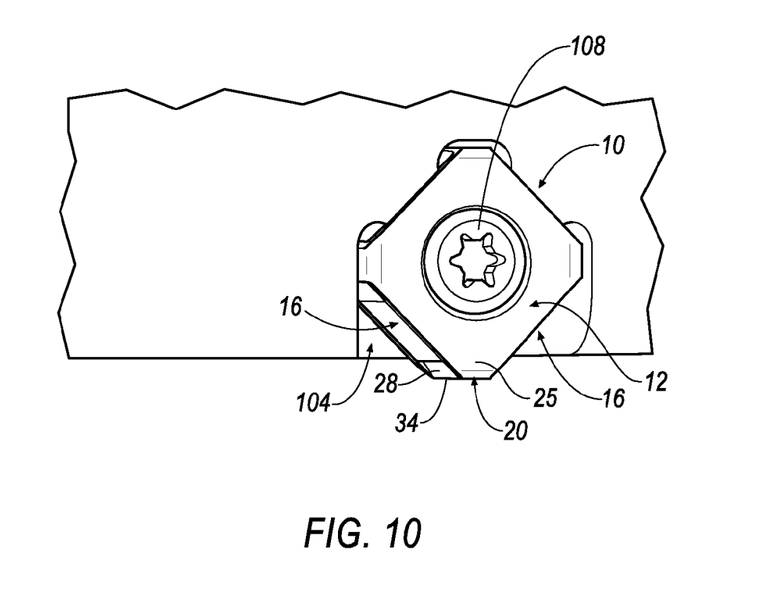
FIG. 10 is an enlarged view of the cutting insert tangentially mounted in the pocket of the milling cutter of FIG. 9.

Referring now to FIGS. 9 and 10, the milling cutter 100 is shown according to an embodiment of the invention in which the cutting insert 10 is tangentially mounted in the pocket 104. Only a single pocket 104 is shown in the illustrated embodiment for brevity. However, it will be appreciated that the invention is not limited by the number of pockets 104 in which the cutting insert 10 can be tangentially mounted therein, and that the invention can be practiced with any desirable number of pockets 104 that are capable of tangentially mounting the cutting insert 10. As seen in FIGS. 9 and 10, the finishing wiper cutting edge 34 is presented to the workpiece when the cutting insert 10 is tangentially mounted in the pocket 104 of the milling cutter 100.

It will be appreciated that the milling cutter 100 can includes both types of pockets 104 for isometrically and tangentially mounting the cutter insert 10 therein. For example, the milling cutter 100 can include a plurality of pockets 104 for isometrically mounting the cutting insert 10 therein, and a plurality of pockets 104 for tangentially mounting the cutting insert 10 therein. In one embodiment, the cutter body 102 can include sixteen (16) pockets 104 for tangentially mounting the cutting insert 10 therein, and four (4) pockets 104 for isometrically mounting the cutting insert 10 therein.

As described above, the cutting insert 10 of the invention is capable of being isometrically and tangentially mounted to the cutter body 102 and presenting multiple types (finishing and roughing) cutting edges 30, 32, 34. Specifically, the cutting insert 10 has a total of sixteen (16) wiper cutting edges 30, 34, eight (8) right-handed roughing cutting edges 32 and eight (8) left-handed roughing cutting edges 32. In addition, the sixteen (16) wiper cutting edges 30, 34 can be used to produce a fine surface finish on the workpiece. As a result, the cutting insert 10 of the invention is capable of performing both roughing and fine finishing machining operations of the workpiece, particularly a workpiece made of soft metal, such as cast iron, and the like.

The patents and publications referred to herein are hereby incorporated by reference.

Having described presently preferred embodiments the invention may be otherwise embodied within the scope of the appended claims.

What is claimed is:

1. An indexable cutting insert, comprising:
a top surface, a bottom surface identical to the top surface, and a plurality of side surfaces that are identical to each other, each side surface including a first pair of chip grooves extending perpendicular to a central, longitudinal axis, and a second pair of chip grooves extending parallel to the central, longitudinal axis;
a plurality of planar corner surfaces, each planar corner surface extending between two adjacent side surfaces;
a first corner radius extending between the top surface and each of the plurality of planar corner surfaces, and a second corner radius extending between the bottom surface and each of the plurality of planar corner surfaces;
a plurality of primary wiper cutting edges formed at an intersection between each of the first pair of chip grooves and the top and bottom surfaces;
a plurality of secondary roughing cutting edges formed at an intersection between each corner radius and each of the first pair of chip forming grooves; and
a plurality of wiper cutting edges formed at an intersection between each planar corner surface and each of the second pair of chip forming grooves.

2. The cutting insert according to claim 1, wherein at least one of the plurality of primary wiper cutting edges and at least one of the plurality of secondary roughing cutting edges are presented to a workpiece when the cutting insert is isometrically mounted in a milling cutter.

3. The cutting insert according to claim 2, wherein at least one of the plurality of wiper cutting edges is presented to a workpiece when the cutting insert is tangentially mounted in a milling cutter.

4. The cutting insert according to claim 1, wherein the plurality of side surfaces are formed at an angle of ninety degrees with respect to each other.

5. The cutting insert according to claim 1, wherein the planar corner surface is formed at an angle of forty-five degrees with respect to an adjacent side surface.

6. The cutting insert according to claim 1, wherein the cutting insert is cubic in shape.

7. A combination milling cutter and cutting insert, comprising:
a cutting insert, comprising:
a top surface, a bottom surface identical to the top surface, and a plurality of side surfaces that are identical to each other, each side surface including a first pair of chip grooves extending perpendicular to a central, longitudinal axis, and a second pair of chip grooves extending parallel to the central, longitudinal axis;
a plurality of planar corner surfaces, each planar corner surface extending between two adjacent side surfaces;
a first corner radius extending between the top surface and each of the plurality of planar corner surfaces, and a second corner radius extending between the bottom surface and each of the plurality of planar corner surfaces;
a plurality of primary wiper cutting edges formed at an intersection between each of the first pair of chip grooves and the top and bottom surfaces;
a plurality of secondary roughing cutting edges formed at an intersection between each corner radius and each of the first pair of chip forming grooves; and
a plurality of wiper cutting edges formed at an intersection between each planar corner surface and each of the second pair of chip forming grooves; and
a milling cutter comprising:
a tool body including a plurality of circumferentially-spaced pockets for receiving the cutting insert,
wherein at least one of the plurality of primary wiper cutting edges and at least one of the plurality of secondary roughing cutting edges are presented to a workpiece when the cutting insert is isometrically mounted in the milling cutter, and
wherein at least one of the plurality of wiper cutting edges is presented to a workpiece when the cutting insert is tangentially mounted in the milling cutter.

8. The combination according to claim 7, wherein the plurality of side surfaces are formed at an angle of ninety degrees with respect to each other.

9. The combination according to claim 7, wherein the planar corner surface is formed at an angle of forty-five degrees with respect to an adjacent side surface.

10. The combination according to claim 7, wherein the cutting insert is cubic in shape.

11. A cutting tool comprising a tool body including plurality of circumferentially-spaced pockets, and a cutting insert mounted in the plurality of pockets, the cutting insert comprising a top surface, a bottom surface identical to the top surface, and a plurality of side surfaces that are identical to each other, each side surface including a first pair of chip grooves extending perpendicular to a central, longitudinal axis, and a second pair of chip grooves extending parallel to the central, longitudinal axis; a plurality of planar corner surfaces, each planar corner surface extending between two adjacent side surfaces; a first corner radius extending between the top surface and each of the plurality of planar corner surfaces, and a second corner radius extending between the bottom surface and each of the plurality of planar corner surfaces; a plurality of primary wiper cutting edges formed at an intersection between each of the first pair of chip grooves and the top and bottom surfaces; a plurality of secondary roughing cutting edges formed at an intersection between each corner radius and each of the first pair of chip forming grooves; and a plurality of wiper cutting edges formed at an intersection between each planar corner surface and each of the second pair of chip forming grooves, wherein the cutting insert is both isometrically mounted and tangentially mounted in the plurality of circumferentially-spaced pockets.

12. The cutting tool according to claim 11, wherein the plurality of side surfaces are formed at an angle of ninety degrees with respect to each other.

13. The cutting tool according to claim 11, wherein the planar corner surface is formed at an angle of forty-five degrees with respect to an adjacent side surface.

14. The cutting tool according to claim 11, wherein the cutting insert is cubic in shape.

15. The cutting tool according to claim 11, wherein the primary finishing wiper cutting edge and the finishing wiper cutting edge have a planar profile.

16. The cutting insert according to claim 1, wherein the cutting insert has eight primary wiper cutting edges, sixteen secondary roughing corner cutting edges, and eight finishing wiper cutting edges.

17. The combination according to claim 7, wherein the cutting insert has eight primary wiper cutting edges, sixteen secondary roughing corner cutting edges, and eight finishing wiper cutting edges.

18. The cutting tool according to claim 11, wherein the cutting insert has eight primary wiper cutting edges, sixteen secondary roughing corner cutting edges, and eight finishing wiper cutting edges.

* * * * *